United States Patent Office 3,567,538
Patented Mar. 2, 1971

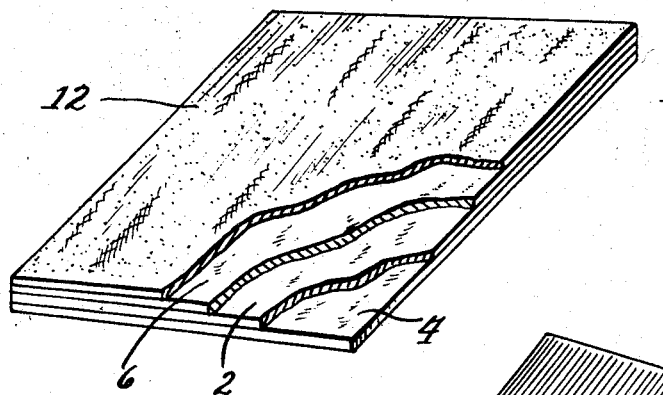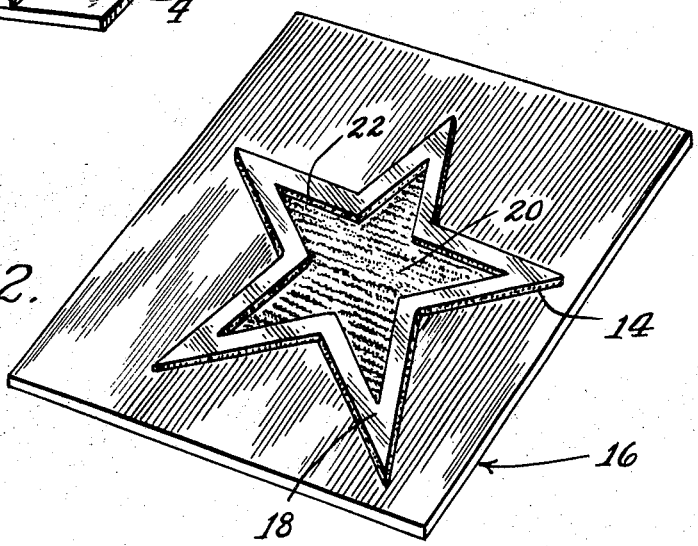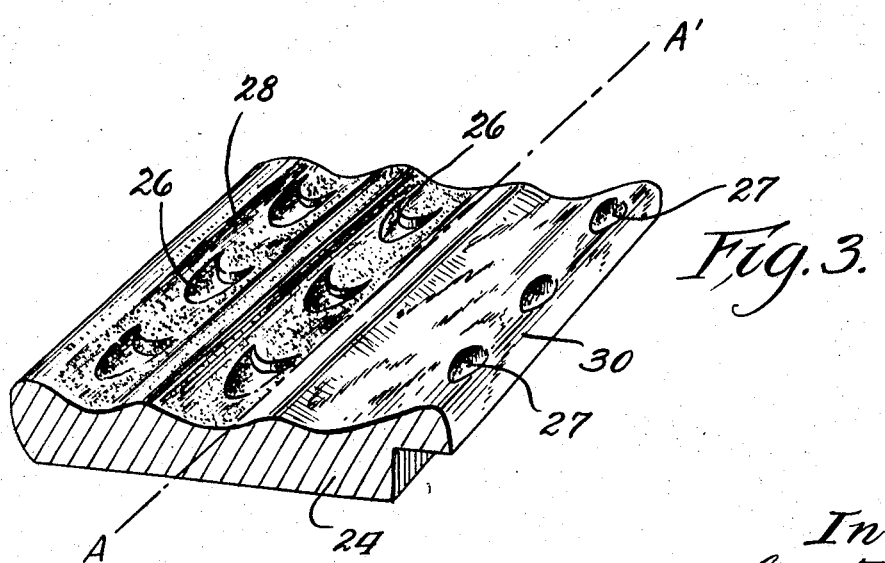

3,567,538
PROCESS OF MAKING LAMINATED
METAL FOIL PRODUCT
Douglas T. Lind, Barrington, Ill., assignor to
Arvey Corporation
Filed Dec. 14, 1967, Ser. No. 690,439
Int. Cl. B29d 31/00; B32b 15/08
U.S. Cl. 156—154                                   5 Claims

ABSTRACT OF THE DISCLOSURE

A laminated sheet suitable for "antiquing" is prepared comprising a metallic foil layer with a transparent plastic film adhering to one side thereof. The plastic film carries on its exposed surface an opaque coating comprising a pigment dispersed in a binder which adheres to the plastic film. The physical strength of the opaque coating is substantially less than that of the plastic film, so that portions of the coating can be removed by buffing action without removing the plastic film from the foil and without damaging the foil underneath. Typically, the foil is aluminum, and at least the outer portion of the plastic film is a biaxially-oriented polyester resin. The laminated sheet of this invention can be affixed to an irregular surface of a substrate and pressed so as to conform to the irregularities, or it can be applied to a flat substrate and embossed to form an irregular surface. The sheet of this invention can be used to impart a metallic sheen to selected portions of a substrate after buffing, and also to impart an "antiqued" appearance resulting from the fact that the opaque coating can be removed by buffing from the high spots of the irregular surface without removing the coating from the recesses and corners.

BACKGROUND OF THE INVENTION

This application relates to a laminated sheet which can be used to provide a metallic sheen to selected portions of a large variety of substrates, and which is particularly designed to provide an "antiqued" appearance to the composite of the laminated sheet and the substrate. The laminated sheet of this invention is typically used on substrates which, in final form, have irregular surfaces with high and low points such as embossments, picture frames, bas reliefs, sculptures, and carvings.

It is known to the art to apply foil laminates to various substrates for the purpose of providing a metallic sheen to the laminate. It is also known to apply foil laminates to irregular surfaces, or to apply the laminate to a flat, embossable substrate and then to emboss it to provide a three-dimensional design in the flat substrate which is coated with the foil laminate, so that the embossment has the appearance of a medallion inlaid in the substrate.

It is also known to vary the coloration of the foil laminate after it has been applied to the substrate by applying a pigment dispersed in a binder to the surface of the foil laminate, and thereafter removing the pigment from the raised portions of the foil laminate, leaving small amounts of pigment in the corners and depressions of the design. This process, which is called "antiquing," is pleasing to the eye, eliminating a certain "flat" impression.

It is also known to apply foil to such articles as picture frames which have no curvature in the longitudinal direction of the frame elements, and thereafter emboss the substrate and foil together to form an intaglio surface. Such articles are also treated for "antique" effect by application of pigment in a binder to the entire embossed surface, followed by removal of pigment from the high points or from selected areas.

The laminated sheet of this invention can be used to provide "antiqued" embossments and coatings without the laborous and time-consuming process of applying a pigment dispersed in a binder. The invention of this application also provides a more durable foil laminate upon which the antiquing process can take place with better control, giving a product which retains the desired appearance for a greater length of time under circumstances where more wear and tear can be applied to the surface of the foil laminate without significant alteration of its appearance.

DESCRIPTION OF THE INVENTION

The product of this invention is a self-supporting sheet comprising a layer of metallic foil with a transparent plastic film adhering to one side of the metallic foil layer, said plastic carrying on its exposed surface an opaque coating comprising a pigment dispersed in a binder which is adherent to said plastic film, the physical strength of the oqaque coating being substantially less than that of the transparent plastic film, whereby portions of the opaque coating can be removed by buffing action without removing said plastic film from the foil layer.

Any metallic foil can be used in this invention, although aluminum foil is most commonly used, and gives excellent results.

Many commercially available metallic foils suitable for use in this invention have thin lacquer coatings which carry a dye to give the film a desired color e.g. a gold or copper tone. These lacquer coatings are generally quite thin, on the order of 0.1 mil, and are usually weak and would be easily removed if contacted by the buffing wheel used to remove the opaque coating of this invention. Thus, the commercially available lacquer coatings on metallic foil cannot function by themselves as the transparent plastic film of this invention because of their inate weakness.

For the purposes of this invention, these thin lacquer coatings are regarded as an integral part of the metallic foils, and the term "metallic foil," as used herein, is to be understood as including lacquered as well as unlacquered metallic foils.

The transparent plastic film used herein is generally of a thickness of at least 0.25 mil, and for plastic films having lower physical strength, the thickness should be at least 0.5 mil. The plastic film can be as thick as desired, the upper limit being limited only by expense, the optical clarity of the plastic used, and the capability of the film to conform to intricate embossing patterns.

The transparent plastic film used in this invention can be applied to the metallic foil layer in any conventional manner, i.e., by pressing a self-supporting plastic film against the foil with heat and pressure or with an adhesive; by applying a solution of the plastic to the foil layer by means of a drawbar, a roller, or a sprayer, and then permitting the solvent to evaporate leaving a supported plastic film on the foil layer; or by combinations of the above methods, for example, in cases where the plastic film consists of more than one layer of plastic, applied in a plurality of steps.

The transparent plastic film can consist of any organic resin or resins which have a physical strength which is high enough so that the plastic film is not easily removed by buffing. Suitable transparent films can, for example, be made from resins such as polypropylene, polyethylene, poly(vinyl chloride), poly(vinyl acetate), cellulose acetate, polyamides such as poly(hexamethylenediamine adipate), polyesters such as polyethylene glycol terephthalate, and polypropylene glycol succinate, polyacrylates, polymethacrylates and polyurethanes.

In one particularly suitable embodiment of this invention, the transparent plastic film is made of a biaxially-oriented polyester resin.

Biaxially-oriented polyester resins are well-known and have the characteristic of very high strength and toughness, and they are thus suitable as the transparent plastic film, or as the outer layer thereof when a multilayer plastic film is used. A suitable polyester resin of this type is polyethylene glycol terephthalate, which is sold under trademark Mylar. This material serves as a protective film of great toughness and durability.

In accordance with this invention, the transparent plastic film carries on its exposed surface, that being the surface which is not in contact with the metallic foil layer, an opaque coating. This coating generally comprises a pigment dispersed in a binder which is adherent to the plastic film.

The opaque coating can be applied in any manner desired, i.e., by spray, by drawbar, by roller, or by a method such as rotogravure printing if it is desired that the opaque coating be a broken or discontinuous, finely-patterned coating for interesting and unusual effects. Where a finely-patterned coating is used, it is preferred that the pattern be fine enough so that any area of about one square inch of the surface will have about the same proportion of opaque coverage as any other area of the same dimension.

The type of pigment used in the opaque coating will of course depend upon the nature of the color desired, which in turn will depend to a degree upon the color of the metallic foil and transparent plastic film, for the pigment is intended to set off and enhance the color of the plastic film and foil layer. Typically a black or dark brown pigment is used.

The nature of the binder used in the opaque coating is limited by the requirement that it have substantially less physical strength than that of at least the outer portion of the transparent film, so that it can be buffed away without harm to the plastic film. Generally, physical strength of this type is a combination of adhesive strength, cohesive strength, and abrasion resistance. Uncured epoxy resins are suitable binders, but any conventional binder material, such as those used in printing inks, may be used.

An advantage of the use of a tough plastic such as a biaxially oriented polyester as at least the outer portion of the transparent film in the product of this invention is that the toughness and strength exhibited by the plastic film increases the durability of the product of this invention, and also permits the use of stronger, more adherent binders in the opaque coating. This means that more rigorous buffing conditions can be used to remove the opaque coating from the surface of the plastic film without fear of damaging the underlying foil. The worker is thus given greater latitude and more flexibility in his technique of preparing his final product, since he need be less cautious about removing too much of the opaque coating. Furthermore, that portion of the opaque coating which is allowed to remain can be made stronger and thus less prone to wear than the related products made by the processes of the prior art.

If desired, other layers can be added to the laminated foil sheet of this invention. For example, the uncovered side of the foil layer in the laminated sheet of this invention can be coated with paper, which, in some embossing processes, improves adhesion to substrates. Also, an adhesive can be applied to the foil side of the laminated sheet of this invention, if desired.

The article of this invention can be used to overlay any of a large number of substrates, e.g., fiberboard, cardboard, or plastic sheets intended for such uses as book covers or wall decorations; wooden objects such as picture frames; ceramic items such as bas reliefs; and molded metal objects.

FIG. 1 shows an oblique view of a typical laminated foil sheet of this invention, greatly magnified, and showing the various layers of the sheet. For clarity, the successive layers of the sheet are shown progressively cut away at one corner of the sheet.

FIG. 2 shows a star-shaped piece of the laminated foil product of this invention embedded in an embossable substrate, forming the upper surface of an embossment, after it has been buffed.

FIG. 3 shows an oblique view of a portion of a wood substrate having a nonplanar upper surface, which is overlaid with the laminated foil product of this invention and then embossed to form indentations.

Referring to FIG. 1, foil layer 2 is an aluminum foil coated with a dye-containing lacquer to give the foil a gold tone. It is laminated on one side to paper backing sheet 4 and on the other side to transparent film 6, a tough plastic film, generally a biaxially-oriented polyester. Opaque layer 12 adheres to the transparent plastic film.

Referring to FIG. 2, a star-shaped portion 14 of the foil laminate of this invention forms the upper surface of an embossment which is formed in an embossable substrate 16 such as thick cardboard. The embossment has been buffed to selectively remove the opaque layer from the high areas of the embossment to expose the plastic film and foil underneath. Such a high area, designated at 18, thus has a metallic sheen because of the absence of the opaque layer.

The center area 20 has an irregular, granular surface, formed by the shape of the embossing die, with minute hills and valleys.

Buffing has generally removed the opaque layer from the raised portions of this surface only, imparting a granular or strippled appearance to the surface.

Protected corners and low areas, such as is shown at 22, still retain the opaque layer.

In FIG. 3, a wooden substrate 24 is overlaid with the foil laminate of this invention, typically with an adhesive between them.

Decorative embossments 26 and 27 can optionally be formed in the surface to which the foil laminate 26 adheres after application of the foil, so that the foil laminate is driven into each embossment. The embossments are generally made by pressing shaped studs into the covered substrate to create indentations of a shape corresponding to that of the stud.

FIG. 3 shows a portion 28 of the foil laminate surface in an unbuffed condition and a portion 30 in a buffed condition, the two areas being divided by line AA'. The unbuffed portion 28 is shaded with the opaque layer of the foil laminate of this invention, while the buffed portion 30 exhibits a metallic sheen except within the embossments 27 in which the opaque layer remains, having been substantially protected by its recessed position.

Thus buffing produces interesting visual effects by the interrelation of dull and metallic areas, generally known as an "antiqued" effect, which is desirable and commercially successful.

In the utilization of the laminated foil sheet of this invention the first step is to adhere the sheet, opaque coating outward, to a suitable substrate capable of being embossed. An embossing die is used to press the sheet into the substrate to form an embossed pattern determined by the configuration of the embossing die. The sheet is then buffed so that portions of the opaque coating are removed without removing the plastic film.

In this buffing process, which can typically be performed with a buffing wheel tightly covered with a soft cloth, the opaque coating is removed from the high and flat portions of the embossment, while it is much less easily removed from corners and grooves in the embossment. The result is that the foil layer and transparent film are exposed on the high and flat portions of the embossment design, and an artistic effect is achieved by means of the interrelation of the exposed plastic film and foil layer with the remaining bits of the opaque coating.

The laminated foil sheet of this invention may also be used without an embossing step by adhering the sheet to a substrate having a nonplanar surface and then buffing, as described above to remove portions of the opaque coating.

In this latter process it is frequently desirable to apply an adhesive to the laminated foil sheet to permit adhesion to the substrate.

In some instances, it may be desired to produce a colored laminated sheet from an uncolored foil or to produce a laminated sheet of a coloring altered from the color of the foil. In such instances, the protective transparent plastic film may be a colored film, containing its own dye.

Also, if desired, the opaque coating can be placed upon the transparent, plastic film before the film is applied to the foil layer.

DESCRIPTION OF SPECIFIC EMBODIMENTS

A gold-colored, paper-backed aluminum foil may be purchased commercially, or may be prepared by laminating one side of an aluminum foil to a paper layer and lacquering the other side with a thin gold-colored, transparent coating. A suitable lacquer comprises a dispersion containing about 10 parts of poly(vinyl chloride-vinyl acetate) and about 5 parts of a polyketone resin (e.g. Krumbharr resin K1717B, from Lawter Chemicals, Inc.) in about 40 parts of methylethylketone and about 22 parts of ethyl acetate, the mixture also containing about 0.6 part of orange dye (Orasol orange G) and about 0.1 part of yellow dye (Orasol yellow 3R), all parts being by weight.

The above-described gold-colored, paper-backed aluminum foil is coated on its foil side with a thin layer of poly(vinyl acetate) adhesive, and a self-supporting film of a biaxially-oriented polyethylene glycol terephthalate resin (sold under the brand name of Mylar) is applied to the adhesive. This laminated composite is rolled across a steel roll having a temperature of about 200° F., and then dried at a temperature of about 190°–200° F.

The resulting laminated foil composite is coated by roller, on its Mylar layer, with a dark brown opaque coating containing about 75 parts of a nitrocellulose dispersion of an assortment of white, yellow, black and red pigments, 12.45 parts of poly(vinyl acetate-vinyl chloride) resin, 34 parts of polyester resin, and 7.5 parts of a polyisocyanate resin, all dispersed in a mixture of about 43 parts of toluol, 33 parts of 2-nitropropane, and 64 parts of methylethylketone, all parts being by weight. This mixture is allowed to dry on the foil laminate to form a solid, opaque coating, and the foil laminate is wound on a spool, ready for use.

A wooden side of a picture frame having a configuration resembling that shown by the picture frame segment of FIG. 3 is overlaid on its face with an adhesive-backed portion of the above foil laminate.

The foil laminate is pressed against the wooden picture frame to bring them into intimate contact, and the laminate-coated wooden side is then embossed with studs to form a series of depressions in the face of wooden side, the foil laminate adhering to the bottoms of the depressions.

The embossed face of the laminate-coated wooden side is then buffed with a cloth-covered buffing wheel until portions of the opaque coating are removed to expose the gold-colored laminate underneath. The opaque coating remains largely intact in the depressions, imparting to the embossed composite the look of aged gold.

From the foregoing, it will be observed that numerous variations and modifications may be effected without departing from the true spirit and scope of the novel concept of the invention. It is, of course, intended to cover by the appended claims all such modifications as fall within the scope of the invention.

What is claimed is:

1. The process of preparing an article having a metallic sheen in selected areas which comprises overlaying an embossable substrate with a sheet comprising a layer of metallic foil with a transparent plastic film adhering to one side of the metallic foil layer to produce a laminated assembly, said plastic film carrying on its entire exposed surface an opaque coating comprising a pigment dispersed in a binder which is adherent to said plastic film, the physical strength of the opaque coating being substantially less than that of the transparent plastic film, said sheet being applied to the substrate with its opaque coating facing outward, adhering said sheet to said substrate, applying an embossing die to said sheet and substrate to form an outer surface having depressions of dimensions substantially in excess of the thickness of the laminated assembly in a configuration determined by said embossing die, and thereafter buffing said sheet, whereby portions, only, of said opaque coating are removed without removing said plastic film.

2. The process of claim 1 in which at least the outer portion of the transparent plastic film consists essentially of a biaxially-oriented polyester.

3. The process of preparing an article having a metallic sheen in selected areas, which comprises overlaying a nonplanar surface of a substrate with a sheet comprising a layer of metallic foil with a transparent plastic film adhering to one side of the metallic foil layer to produce a laminated assembly, said plastic film carrying on its entire exposed surface an opaque coating comprising a pigment dispersed in a binder which is adherent to said plastic film, the physical strength of the opaque coating being substantially less than that of the transparent plastic film, said sheet being applied to the substrate with its opaque coating facing outward, adhering said sheet to the substrate, whereby the sheet assumes the configuration of said nonplanar surface, and thereafter buffing said sheet, whereby portions of said opaque coating are removed without removing said plastic film.

4. The process of claim 3 in which at least the outer portion of the transparent plastic film consists essentially of a biaxially-oriented polyester.

5. The process of claim 3 in which an adhesive is placed between said sheet and substrate prior to pressing.

References Cited

UNITED STATES PATENTS

| | | | |
|---|---|---|---|
| 242,507 | 6/1881 | Cahoone et al. | 161—213 |
| 2,602,036 | 7/1952 | Sullivan | 156—154X |
| 2,702,580 | 2/1955 | Bateman | 161—214X |
| 2,706,355 | 4/1955 | Brown | 161—413X |
| 2,765,250 | 10/1956 | Williams | 161—214X |
| 2,853,117 | 9/1958 | Dibblee | 156—154 |
| 2,861,022 | 11/1958 | Lundsager | 161—214 |
| 3,013,919 | 12/1961 | Bialy | 161—214X |
| 3,052,589 | 9/1962 | Ruscoe et al. | 156—277 |
| 3,357,773 | 12/1967 | Rowland | 161—116X |

HAROLD ANSHER, Primary Examiner

U.S. Cl. X.R.

156—209, 220; 161—116, 146, 164, 213, 413